(No Model.) 2 Sheets—Sheet 1.

W. F. MURPHY.
ROAD CART.

No. 460,648. Patented Oct. 6, 1891.

(No Model.)

2 Sheets—Sheet 2.

W. F. MURPHY.
ROAD CART.

No. 460,648. Patented Oct. 6, 1891.

Witnesses:
C. H. Raeder
H. F. Matthews.

Inventor:
Wm. F. Murphy
James J. Sheehy
Attorney

UNITED STATES PATENT OFFICE.

WILLIAM F. MURPHY, OF IOWA CITY, ASSIGNOR TO THOMAS E. MURPHY, OF NORTH LIBERTY, IOWA.

ROAD-CART.

SPECIFICATION forming part of Letters Patent No. 460,648, dated October 6, 1891.

Application filed November 18, 1890. Serial No. 371,879. (No model.)

*To all whom it may concern:*

Be it known that I, WILLIAM F. MURPHY, a citizen of the United States, residing at Iowa City, in the county of Johnson and State of Iowa, have invented a new and useful Road-Cart, of which the following is a specification.

This invention has relation to a cart capable of use as a road or business cart and readily convertible into a sulky or breaking cart for young horses; and the novelty will be fully understood from the following description and claims, when taken in connection with the annexed drawings, in which—

Figure 1:
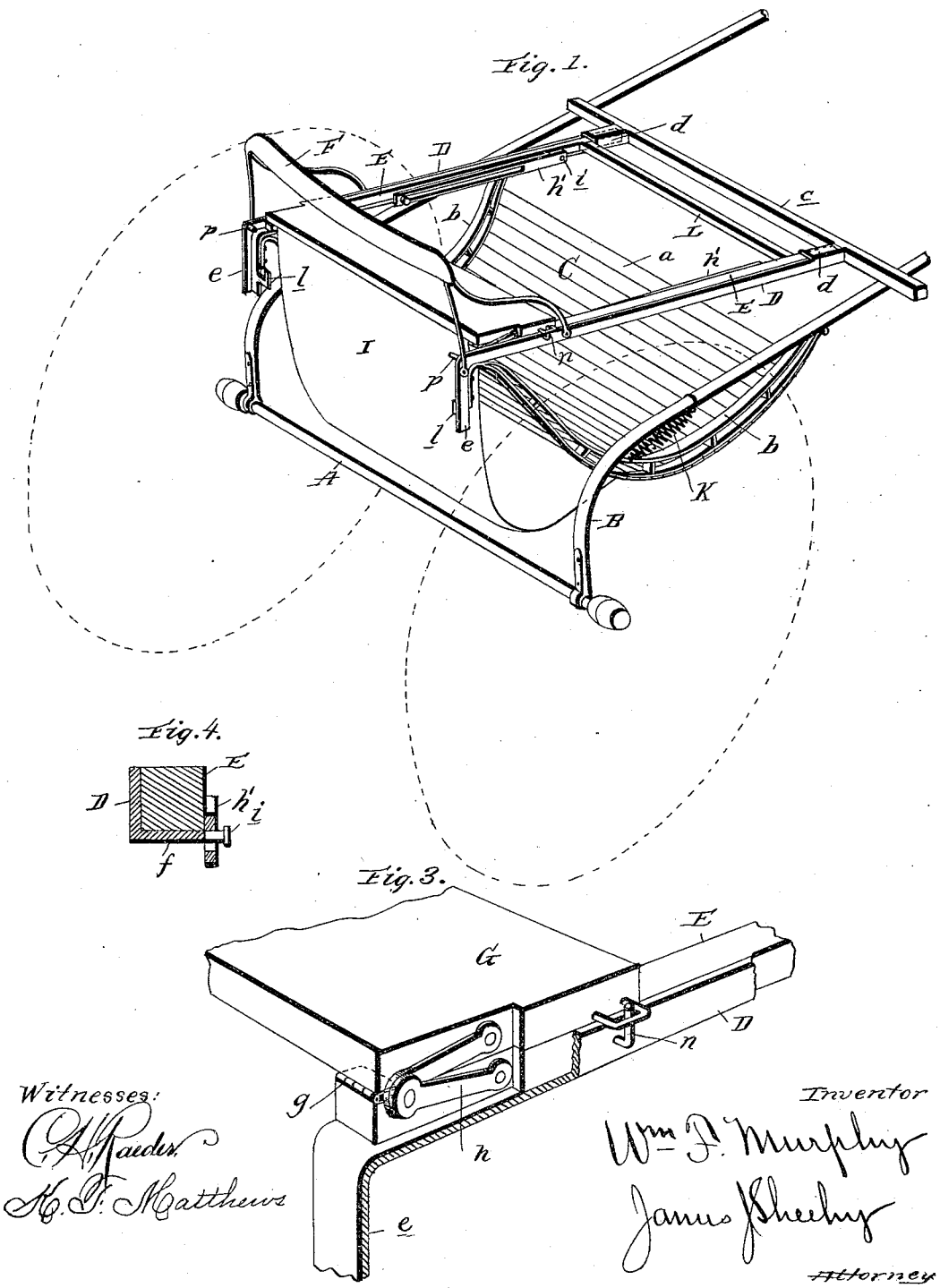
Figure 2:
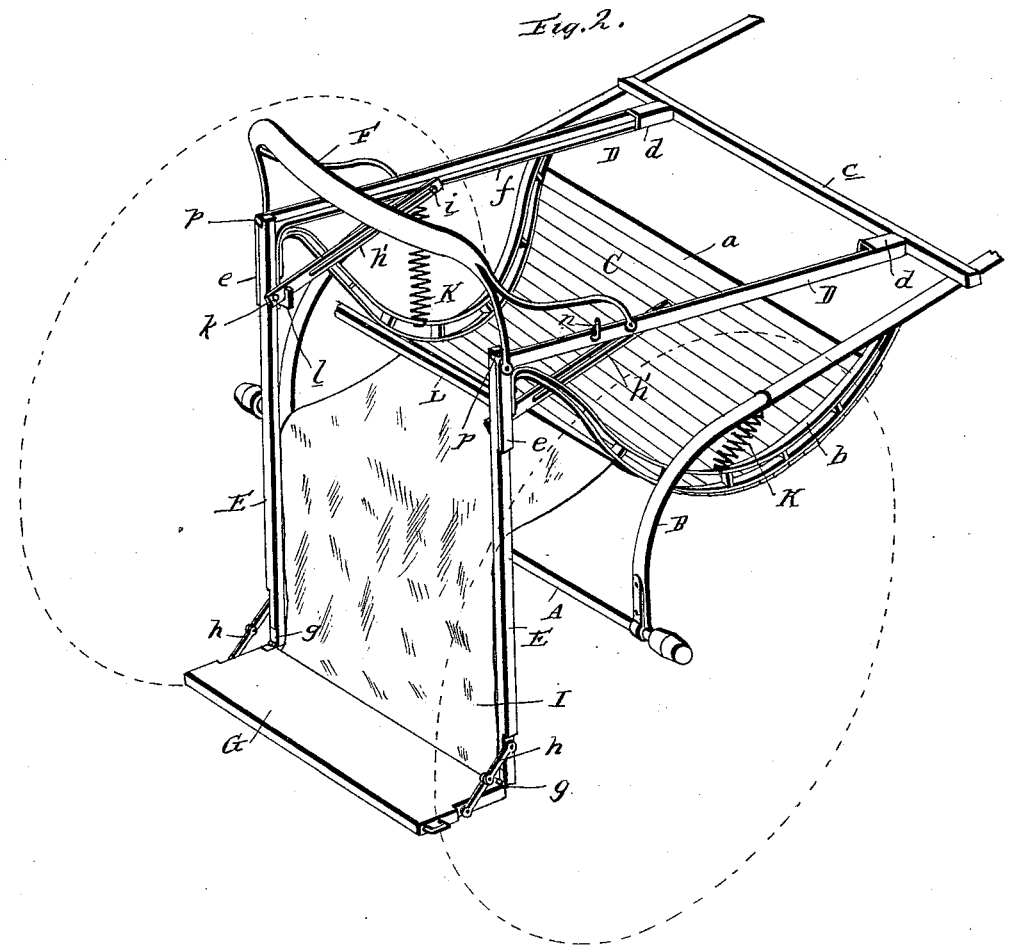

Figure 1 is a perspective view of my improved cart, showing the same in position to be used as a road or business cart. Fig. 2 is a similar view showing the parts arranged in a position to be used as a breaking-cart. Fig. 3 is a sectional detail view of one of the angular lateral bars and one of the sliding bars, showing the seat in a folded position; and Fig. 4 is a cross-sectional view of one of the lateral bars and one of the sliding bars, taken at the pivotal point of one of the tumblers.

In carrying out my invention I provide an axle A, and support the same upon suitable wheels, as shown in dotted lines. To the axle is clipped in the ordinary manner the rear curved ends of a pair of shafts B.

C indicates a foot-rest, which is mainly of the ordinary construction, composed of slats $a$ and flat spring bars or connections $b$. These bars $b$ are secured at their forward ends at a suitable point to the shafts B, and curving downwardly, rearwardly, and thence upwardly, have their opposite ends secured to depending branches of lateral bars D, as will be presently explained.

The horizontal lateral bars D are of an angular form in cross-section, as better shown in Fig. 4, to receive and support the sliding bars carrying the convertible seat and step. The forward ends of these bars are secured to a cross-bar $c$, which is fixed to the shafts, as shown, and said forward ends carry sockets $d$ for the reception of the forward ends of the sliding bars E when said bars have been slid upon the bars D. The rear or opposite ends of these bars D terminate in depending branches $e$, arranged in a perpendicular position, and the lower wall or flange $f$ of the bars D continue around the forward vertical side of these depending branches, so as to form a stop for and steady the position of the bars E when used as a breaking-cart, as shown in Fig. 2 of the drawings, and the rear ends of the steel trusses $b$ are bent downwardly, as shown, and secured to the flanges or walls $f$ of the depending branches $e$. It will be thus seen that the forward ends of the bars D are fixed in position by the cross-bar $c$ on the shafts, and the opposite or rear ends are sustained in position by the steel trusses $b$.

F indicates a lazy-back when the device is used as a road-cart, and this back serves the additional function of a chest-support when the device is used as a breaking-cart.

G indicates a seat which serves the additional function of a step. This seat is hinged at one edge to one end of the sliding bars E by means of suitable hinges $g$, and bracket arms or braces $h$ are employed for staying said seat in a position at right angles to the sliding bars E when used as a step, as shown in Fig. 2 of the drawings. These sliding bars E are pivotally connected at a suitable point to the inner sides of the lateral bars D, and such connections are made by means of tumblers $h'$, which are slotted for the greater portion of their length. These tumblers are connected with the side or lateral bars D by means of a stud $i$ or other suitable device passing through the slot in said tumblers, and the opposite ends of the tumblers are connected with the bars E by means of pivot-pins $k$, and a suitable stop $l$ is provided on the depending branches $e$ to receive the tumblers, as shown.

From this construction it will be seen that the bars E may slide upon the bars D and that the step G may be sustained in a horizontal position, as shown in Fig. 2, as well as fold upon the bars E, as shown in Fig. 1, and in order that the seat may be prevented from sliding when used as a road-cart it is necessary to provide a stop or fastening for the same. In the present illustration I have shown this stop as composed of a staple arranged in one edge of the seat G and a vertically-disposed stud $m$ in one of the bars D to receive said staple, although it is obvious that any suitable devices might be employed for this purpose.

In order to properly stay the vertical position of the bars E when the device is used as a breaking-cart and under the construction shown, it is necessary to provide a stop or catch at *p* on the bars D.

I indicates a shield or guard for mud and the like. This shield may be composed of canvas or other suitable material and secured at one end to the foot-rest, as shown, with its opposite end secured to the convertible seat and step G, and it will be seen that this guard or shield assumes a position so as to protect the driver from mud or the like when the device is used both as a breaking-cart and a driving-cart.

The foot-rest is sustained yieldingly on the shafts by means of spiral or coiled springs K, which connect the trusses *b* at an intermediate point of their length to said shafts.

The sliding bars E may be connected by a crossed bar L.

In operation, when the device is in position to be used as a road or business cart and it is desirable to convert it into a breaking-cart, it is simply necessary to first raise the seat G, so as to disconnect it from the fastening device on the bar D, and then draw it, together with the bars E rearwardly, and downwardly, so as to open said seat and form a step and bring the bars E in a vertical position with the tumblers in the position shown in Fig. 2. The driver may then firmly stand upon the step G, when the back F will serve as a chest-support and the guard L will protect him from dirt and the like. When it is desirable to turn the device into a driving-cart, the step is first turned up against the bars E. Said bars are then raised and pushed forwardly upon the bars D until the parts assume the position shown in Fig. 1, with the staple of the seat in the stud *n* on the bars D and the forward ends of the bars E in the sockets *d*.

Having described my invention, what I claim, and desire to secure by Letters Patent, is—

1. A convertible driving and breaking cart having a sliding frame, in combination with tumblers connecting said sliding frame to a fixed frame, and a hinged seat adapted to serve the additional function of a step, substantially as specified.

2. In a cart, the combination, with a sliding frame carrying a hinged seat adapted to be converted into a step, of tumbler-arms connecting the sliding frame with a main frame, and a guard or shield adapted to protect the driver when the cart is used both as a driving and breaking cart, substantially as specified.

3. In a driving-cart, the combination, with a main frame having lateral bars, of a lazy-back mounted on one end thereof, a sliding frame pivotally connected with said bars, a convertible seat and step hinged to one end of said sliding frame, and slotted tumblers pivotally connecting the sliding frame with said lateral bars, substantially as specified.

4. In a cart, the combination, with the axle and shafts, of the trusses, the lateral longitudinal bars secured to the shafts by a cross-bar and having their rear ends terminating in depending branches, the foot-rest, the sliding frame pivotally connected with the lateral bars, the hinged convertible seat and step, the guard secured at one end to said step and at its opposite end to the foot-rest, and the tumblers connecting the sliding frame to the lateral bars, substantially as specified.

5. The convertible road-cart and breaking-cart described, consisting of the usual axle-supporting wheels and shafts and the cross-bar secured to the shafts, the longitudinal lateral bars secured to said cross-bars and having sockets at their forward ends and their rear ends terminating in depending branches, the lazy-back secured to said bars and adapted to serve the additional function of a chest-support, the sliding bars, the hinged step on one end of the sliding bars, the slotted tumblers connecting said sliding bars with the lateral bars, the trusses connected at one end to the shafts and at their opposite end to the depending branches of the lateral bars, and the spiral springs connecting the trusses with the shafts, substantially as specified.

WILLIAM F. MURPHY.

Witnesses:
F. A. HASTINGS,
C. D. JAMESON.